(12) United States Patent
Dow

(10) Patent No.: US 7,104,883 B2
(45) Date of Patent: Sep. 12, 2006

(54) STRAW CHOPPER BLADE

(75) Inventor: Chad Allen Dow, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/601,511

(22) Filed: Jun. 23, 2003

(65) Prior Publication Data
US 2004/0259611 A1 Dec. 23, 2004

(51) Int. Cl.
*A01F 12/40* (2006.01)
(52) U.S. Cl. .................................... 460/112
(58) Field of Classification Search ............... 460/112, 460/111, 70, 901; 56/500, 503, 504, 505, 56/60; 241/243; 239/668, 681
See application file for complete search history.

(56) References Cited
U.S. PATENT DOCUMENTS

| 9,114 A | * | 7/1852 | Gilbert | 460/71 |
| 2,932,145 A | | 4/1960 | Scranton | 56/122 |
| 3,103,241 A | | 9/1963 | Weigel | 146/107 |
| 3,717,062 A | | 2/1973 | Gaeddert | |
| 4,137,923 A | * | 2/1979 | Druffel et al. | 460/112 |
| 4,995,228 A | * | 2/1991 | Hladik, Jr. | 56/255 |
| 5,042,973 A | * | 8/1991 | Hammarstrand | 460/112 |
| 5,232,405 A | | 8/1993 | Redekop et al. | 460/112 |
| 5,482,508 A | | 1/1996 | Redekop et al. | 460/112 |
| 5,556,042 A | * | 9/1996 | Roberg | 241/101.76 |
| 6,511,374 B1 | * | 1/2003 | VanEe | 460/112 |
| 6,572,035 B1 | * | 6/2003 | Pfeiffer | 239/650 |
| 2002/0004417 A1 | * | 1/2002 | Redekop | 460/112 |
| 2002/0119809 A1 | * | 8/2002 | Bognar et al. | 460/112 |

FOREIGN PATENT DOCUMENTS

EP 1 232 683 8/2002

* cited by examiner

*Primary Examiner*—Árpád Fábián Kovács

(57) ABSTRACT

A straw chopper blade comprising a flat blade defining a plane. The blade has a leading edge and a trailing edge. The leading edge is provided with a sharpened cutting edge that extends from the tip of the blade radially inward towards its mounting assembly. The leading edge is also provided with a paddle that extends perpendicular from the blade adjacent to the mounting assembly.

13 Claims, 4 Drawing Sheets

US 7,104,883 B2

STRAW CHOPPER BLADE

FIELD OF THE INVENTION

The present invention is directed to a straw chopper blade having a leading edge that is provided with a radially inboard paddle and a radially outboard sharpened cutting edge.

BACKGROUND OF THE INVENTION

Straw Choppers are used on agricultural harvesting machines to reduce the size of crop material other than grain, that is processed by the harvesting machine. Typically, the straw chopper comprises a housing that encloses a rotor. The housing is provided with an inlet for receiving crop material other than grain that has been processed by the crop processing unit and an outlet for distributing the chopped crop material back to the field. The housing is also provided with a bank of stationary cutter knives. The rotor is provided with a plurality of pendulously mounted straw chopper blades that cooperate with the stationary knives to chop the crop material entering the straw chopper. The rotor typically comprises a cylindrical tube having a plurality of mounting locations distributed around the periphery of the rotor. The straw chopper blades are pendulously mounted to the mounting locations.

It has been known to equip the rotating chopper blades with paddles to generate airflow through the straw chopper to better distribute the chopped crop material back to the field. The leading edge of the straw chopper blades maybe provided with a sharpened cutting edge and the paddles are typically mounted to the trailing edge of the straw chopper blades behind the sharpened cutting edge.

SUMMARY OF THE INVENTION

It is an object of the present invention to provide a straw chopper blade having a paddle for increased air flow that can be more closely spaced within the straw chopper to provide a more fine cut chopped crop material.

The straw chopper of the present invention is provided with a housing having and inlet for receiving previously processed crop material other than grain and an outlet from which the chopped crop material is expelled. The housing is also provided with a bank of stationary knifes. A rotor is located in the housing and is provided with a plurality of mounting locations to which are mounted a plurality of straw chopper blades. The straw chopper blade of the present invention comprises a flat blade having a leading and trailing edge defining a plane. The blade has a first end having a mounting assembly for pendulously mounting the blade to the straw chopper mounting locations, and a second end opposite from the first end that is provided with a tip. A sharpened cutting edge is formed on the leading edge of the blade and extends from the tip towards the first end. A paddle integral with the blade extends at an angle from the leading edge of the blade perpendicularly to the plane defined by the blade.

Alternate embodiments of the blade include placing a second sharpened cutting edge on the trailing edge. In addition, the two edged blade may also be provided with a second paddle on the trailing edge.

DETAILED DESCRIPTION

Figure 1:
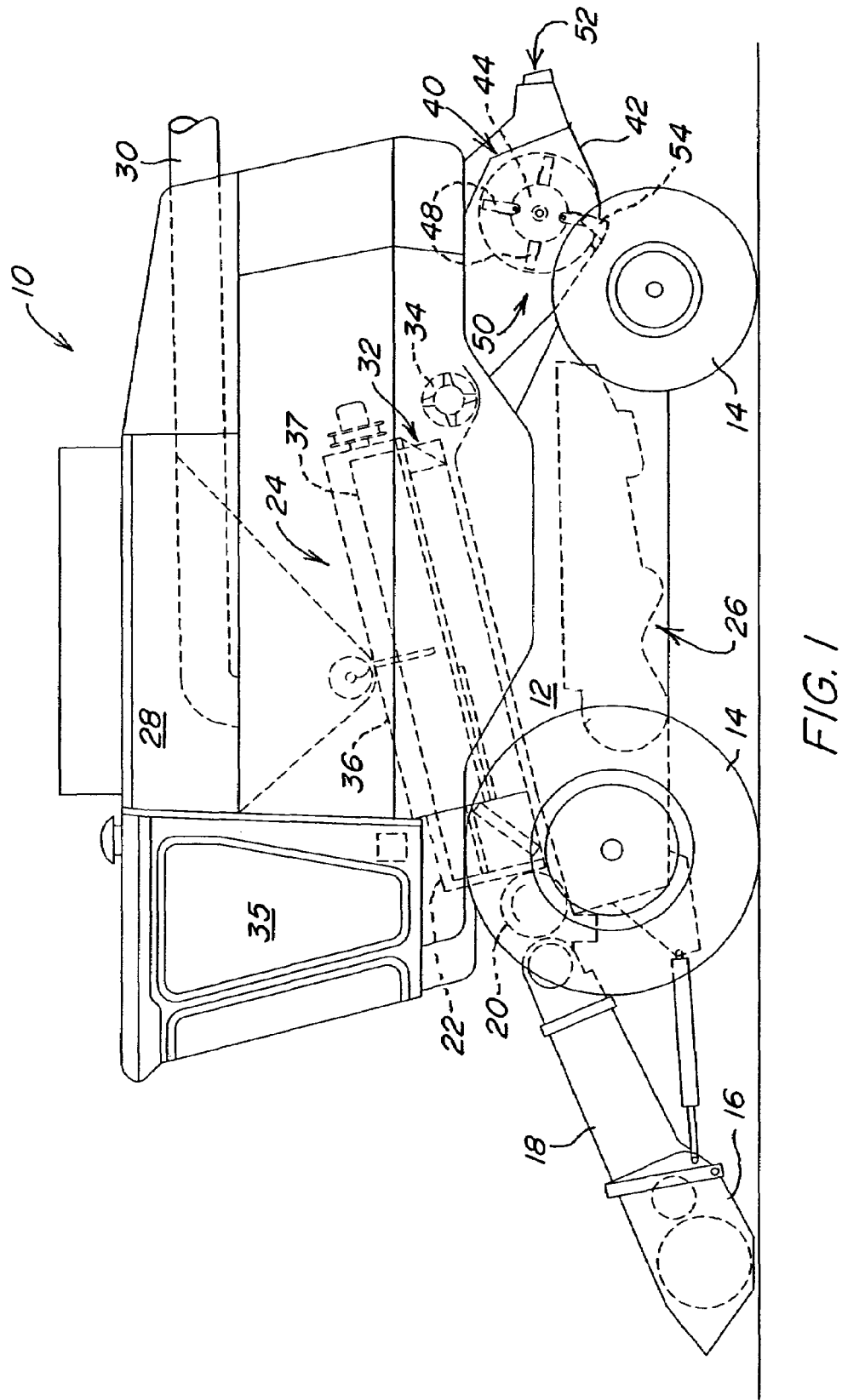
FIG. 1 is a semi-schematic side view of an agricultural combine.

FIG. 1 shows an agricultural harvesting machine in the form of a combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The harvested crop is directed by the feederhouse 18 to an infeed beater 20. The infeed beater 20 directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater 34 in turn propels the harvested crop material other than grain to a straw chopper 40. The operation of the combine is controlled from operator's cab 35.

The axial crop processing unit comprises a cylindrical rotor housing 36 and a rotor 37 located inside the housing 36. The front part of the rotor 37 and the rotor housing 36 define the infeed section of the crop processing unit 24. Longitudinally downstream from the infeed section are threshing section, separating section and discharge section. The rotor 37 in the infeed section is provided with a conical rotor drum having helical infeed elements for engaging harvested crop material received from the infeed beater 20 and inlet transition section 22. Immediately downstream from the infeed section is the threshing section of the crop processing unit 24. In the threshing section the rotor 37 comprises a cylindrical rotor drum having a number of threshing elements for threshing the harvested crop material received from the infeed section. Downstream from the threshing section is the separating section wherein the grain trapped in the threshed crop material is released and falls through a floor grate to the cleaning system 26. The separating section merges into a discharge section where crop material other than grain is expelled from the axial crop processing unit 24 to the discharge beater 34. Although the invention is illustrated as being used on a rotary combine, the present invention can be used on other combine types including conventional straw walker combines and hybrid combines having transverse threshing cylinders and rotary separators.

The straw chopper 40 comprises of housing 42 and a rotor 44. The rotor 44 is provided with a plurality of mounting locations 46 for receiving straw chopper blades 48. The housing 42 is provided with an inlet 50 for receiving previously processed harvested crop material other than grain and an outlet 52 for discharging the chopped crop material back to the field. The housing 42 is also provided with a bank of stationary knives 54 that cooperate with the rotating straw chopper blades 48. In FIG. 1, the straw chopper rotor 44 would rotate in a counterclockwise direction.

Figure 2:
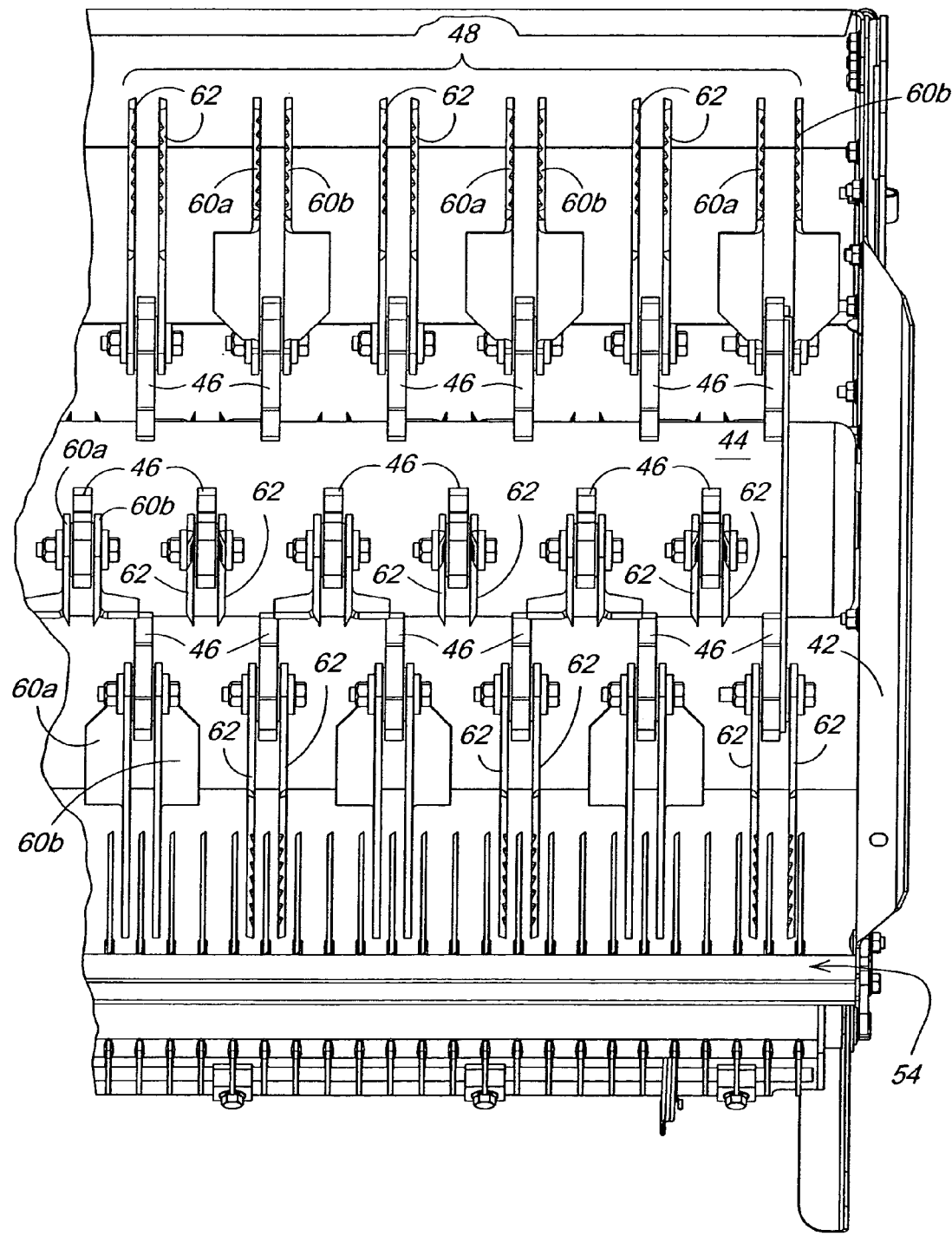
FIG. 2 is a partial front view of the straw chopper.

As shown in FIG. 2, the rotor 44 is provided two types of chopper blades, paddle blades and straight blades 62. The straight blades 62 are relatively conventional in design and are provided with sharpened leading and trailing edges and a mounting assembly so they can be pendulously mounted on the mounting locations. The reason that the straight blades 62 have cutting edges on both the leading and trailing edges is so that they can be reversed if the original leading edge becomes too dull. The paddle blades of the illustrated rotor 44 comprise left handed paddle blades 60a and right handed paddle blades 60b.

The left handed and right handed paddle blades 60a and 60b comprise a blade 70 having a leading edge 72, a trailing edge 74, a first end 76 and a second end 78. The first end 76 is provided with a mounting assembly 80, comprising a mounting hole. This mounting assembly 80 allows the blade to be pendulously mounted to the mounting locations 46 located on the rotor 44. The second end 78 of the blade 70 is provided with a tip 82. The leading edge 72 is provided with a sharpened cutting edge 84 that extends from the tip 82 towards the first end 76. Adjacent the first end 76 of the blade 70 is a paddle 86 extending at an angle from the plane of the blade 70. As shown in the figures, this paddle 86 extends in a perpendicular direction from the blade 70. The paddle 86 is integral with the blade 70 as it is bent from the blade blank.

Figure 3:
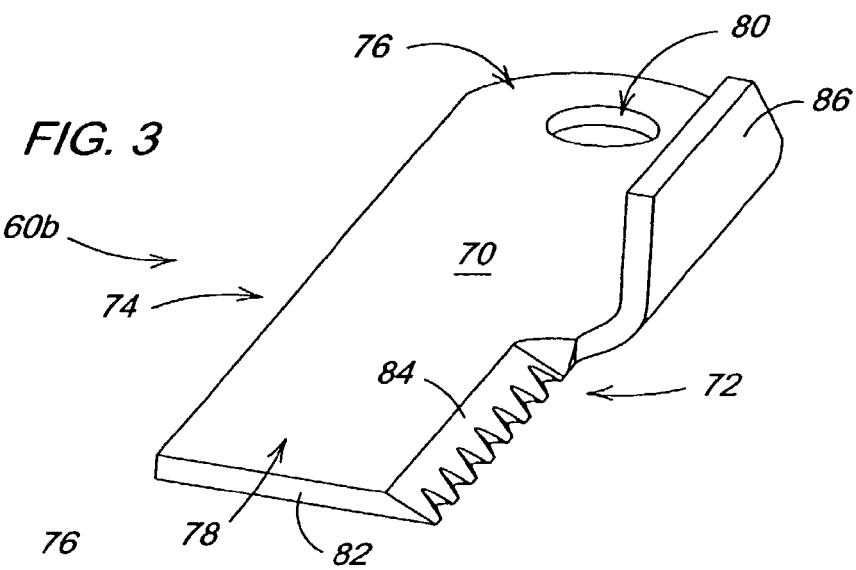
FIG. 3 is a perspective view of a right hand straw chopper blade.
Figure 4:
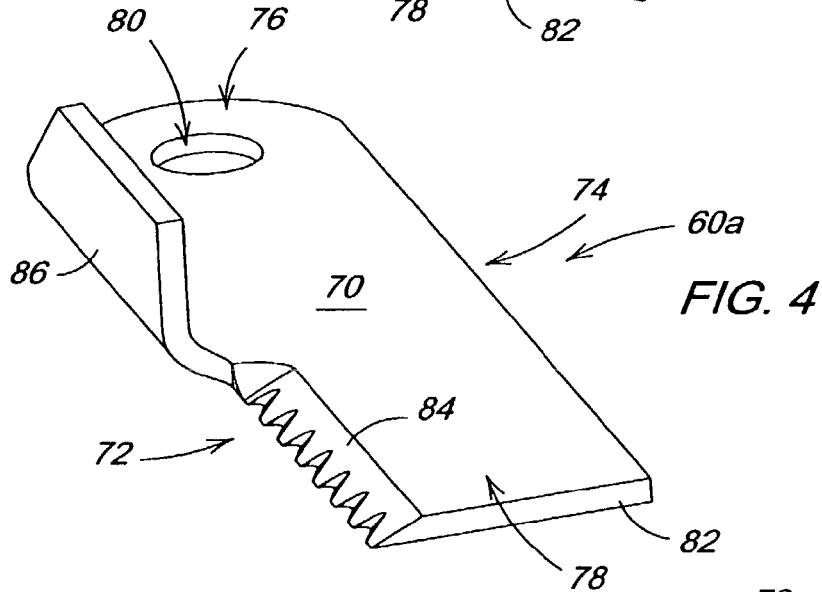
FIG. 4 is a perspective view of a left hand straw chopper blade.
Figure 5:
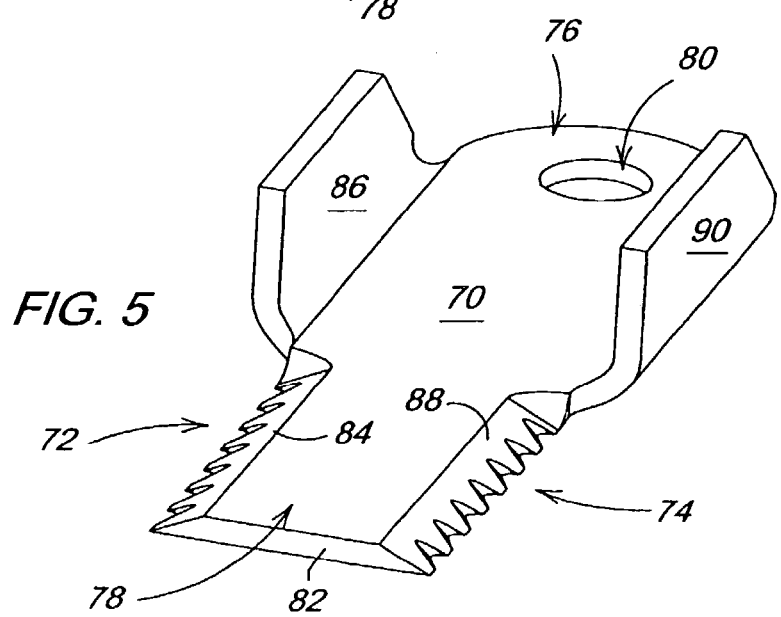
FIG. 5 is a perspective view of a second alternative embodiment of the straw chopper blade.
Figure 6:
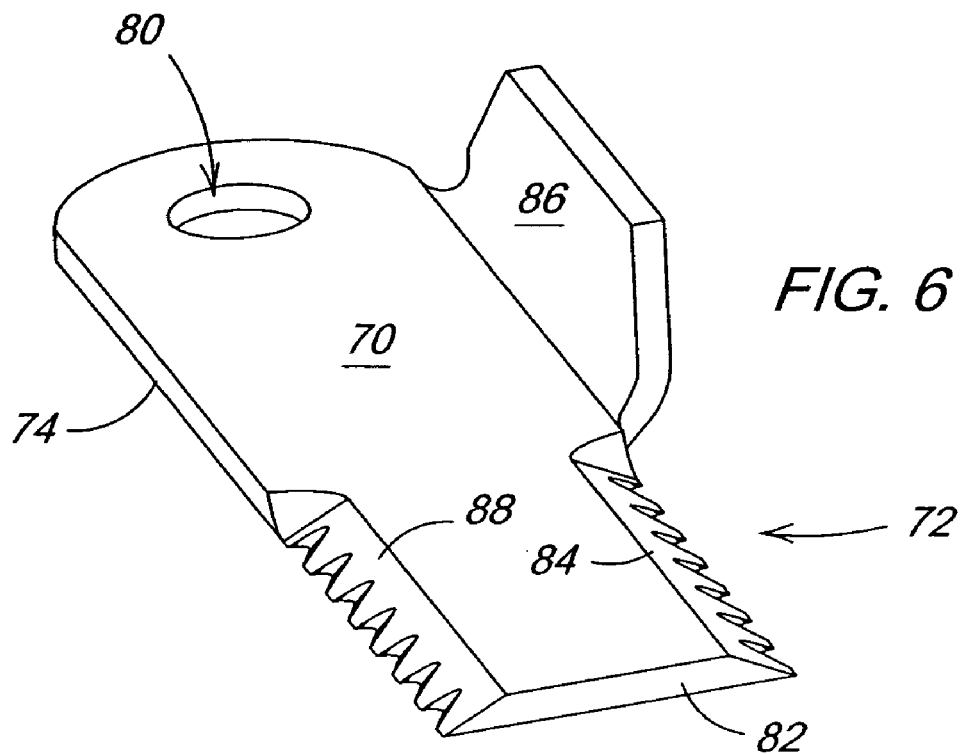
FIG. 6 is a third alternative embodiment of a right hand straw chopper blade.
Figure 7:
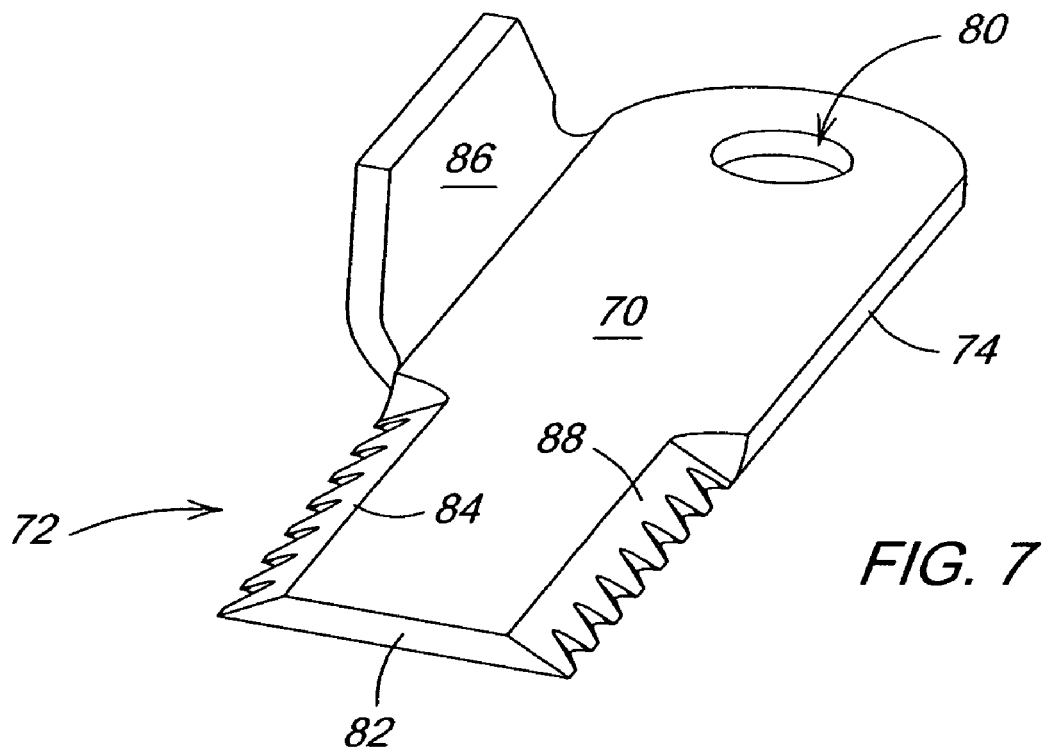
FIG. 7 is the third alternative embodiment of a left hand straw chopper blade.

FIGS. 3 and 4 disclose left and right hand paddle blades 60a and 60b. An alternative embodiment is disclosed in FIG. 5 wherein the trailing edge 74 is also provided with a second sharpened cutting edge 88 and a second paddle 90. In this embodiment the blade can be reversed and used in both left and right applications. A third embodiment is shown in FIGS. 6 and 7, wherein the trailing edge 74 is provided with a second sharpened cutting edge 88 and not a second paddle. Similarly, these blades can be reversed albeit the paddle would then be located on the trailing edge and not the leading edge in its reverse configuration and the blades would have to switch sides.

All of the above identified straw chopper blade embodiments are illustrated as having a serrated cutting edge and having a single ground side, however, non-serrated cutting edges could also be used as could be double beveled cutting edges.

Having described the illustrated embodiment, it will become apparent that various modifications can be made without departing from the scope of the invention as defined in the accompanying claims.

The invention claimed is:

1. A straw chopper blade comprising:
   a blade having a leading edge and a trailing edge,
   the blade also having a first end, the first end having a blade mounting assembly for pendulously mounting the blade to a straw chopper,
   the blade also having a second end remote from the first end, the second end being provided with a tip,
   a sharpened cutting edge is formed on the leading edge at the second end and extends from the tip towards the first end; and
   the first end further having a paddle that extends at a perpendicular angle from a plane of the blade from the leading edge thereof.

2. The straw chopper blade as defined by claim 1 wherein the trailing edge of the second end is provided with a second sharpened cutting edge extending from the tip towards the first end.

3. The straw chopper blade as defined by claim 2 wherein a second paddle extends at an angle from the trailing edge of the first end predominantly perpendicular to the plane of the blade.

4. A straw chopper for an agricultural harvesting machine comprising:
   a rotor having a plurality of mounting locations;
   a housing enclosing the rotor, the housing having an inlet for receiving agricultural material and an outlet through which chopped agricultural material is expelled;
   a bank of stationary blades are mounted to the housing;
   a plurality of straw chopper blades are pendulously mounted to the rotor at the mounting locations,
   each straw chopper blade having a leading edge and a trailing edge, the straw chopper blade also having a first end with a blade mounting assembly for pendulously mounting the straw chopper blade to the rotor, the straw chopper blade also having a second end remote from the first end, the second end being provided with a tip, a sharpened cutting edge is formed on the leading edge at the second end and extends from the tip towards the first end and a paddle also extends at an angle from the leading edge of the first end wherein the paddle is positioned between the mounting assembly and the cutting edge.

5. The straw chopper as defined by claim 4 wherein the straw chopper blade defines a plane and the paddle is predominantly perpendicular to the plane.

6. The straw chopper as defined by claim 5 wherein the trailing edge of the second end is provided with a second sharpened cutting edge extending from the tip towards the first end.

7. The straw chopper as defined by claim 6 wherein a second paddle extends at an angle from the trailing edge of the first end, predominantly perpendicular to the plane of the straw chopper blade.

8. A straw chopper blade comprising:
   a flat blade having a leading edge and a trailing edge and having a first end and an opposite second end;
   a mounting hole is provided on the first end for pendulously mounting the blade to a rotor;
   a sharpened cutting edge is formed on the leading edge at the second end, the flat blade defining a plane;
   an integral paddle is bent from the flat blade at the leading edge of the first end between the mounting hole and the cutting edge formed on the leading edge at the second end and extends at an angle from the plane defined by the flat blade.

9. The straw chopper blade as defined by claim 8 wherein the rotor is a straw chopper.

10. The straw chopper blade as defined by claim 9 wherein the integral paddle is adjacent the mounting hole.

11. The straw chopper blade as defined by claim 10 wherein the paddle extends predominantly perpendicular to the plane defined by the flat blade.

12. The straw chopper blade as defined by claim 11 wherein the trailing edge of the first end is provided with a second sharpened cutting edge.

13. The straw chopper blade as defined by claim 12 wherein a second paddle is integral with and bent from the flat blade at the first end thereof at an angle from the trailing edge predominantly perpendicular to the plane of the blade.

* * * * *